(12) United States Patent
Geren et al.

(10) Patent No.: US 6,903,533 B1
(45) Date of Patent: *Jun. 7, 2005

(54) POWER FAULT BATTERY PROTECTION CIRCUIT

(75) Inventors: Michael D. Geren, Suwanee, GA (US); Roger L. Boyer, Snellville, GA (US); John E. Herrmann, Sugar Hill, GA (US); Jenny Collier, Dunsany (IE)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/737,021

(22) Filed: Dec. 16, 2003

(51) Int. Cl.$^7$ .................................................. H02J 7/00
(52) U.S. Cl. ...................................................... 320/134
(58) Field of Search ........................................ 320/134

(56) References Cited

U.S. PATENT DOCUMENTS 5,164,652 A * 11/1992 Johnson et al. ............. 320/106
5,185,566 A * 2/1993 Goedken et al. ............ 320/113
5,767,657 A * 6/1998 Oglesbee ..................... 320/101

OTHER PUBLICATIONS

U.S. Appl. No. 10/811,665, filed Mar. 2004, Michael Geren.*

* cited by examiner

*Primary Examiner*—Pia Tibbits
(74) *Attorney, Agent, or Firm*—Philip H. Burrus, IV

(57) ABSTRACT

A battery protection circuit is provided that includes a safety circuit and an overpower circuit. The safety circuit monitors the voltage and current of at least one rechargeable cell within the battery pack, and disconnects the cell(s) from the external terminals of the battery pack when either the voltage becomes too high or low, or when excessive current is being drawn from the battery pack. The overpower circuit monitors the power being delivered to or sourced from the battery pack to the load. The overpower circuit actuates when the power exceeds a predetermined threshold, thereby simulating an overcurrent condition in the safety circuit. The overcurrent condition causes a disconnect means, like a transistor, to open, thereby disconnecting the cell(s) from the external terminals. The battery protection circuit then latches in this disconnected state until a load is removed from the terminals of the battery pack.

18 Claims, 5 Drawing Sheets

US 6,903,533 B1

POWER FAULT BATTERY PROTECTION CIRCUIT

BACKGROUND

1. Technical Field

This invention relates generally to protection circuits for rechargeable battery packs, and more specifically to protection circuits that disable a rechargeable battery pack due to an excessive amount of power being drawn by the load.

2. Background Art

Portable electronic devices, like cellular telephones, pagers and two-way radios for example, derive their portability from rechargeable batteries. Such batteries allow these devices to slip the surly bonds of wall mounted power supplies and wirelessly touch the hand of the user wherever he may be.

While many people may think that a rechargeable battery is simply a cell and a plastic housing, nothing could be further from the truth. Rechargeable battery packs often include circuit boards, electronic circuitry, mechanical assemblies and electromechanical protection components. The circuits employed in rechargeable battery packs include charging circuits that start, ramp, taper and stop current, fuel gauging circuits, temperature measurement circuits and indicator circuits, just to name a few. Simply put, a battery pack is a complex system of components working in harmony to safely deliver power to a portable electronic device.

One of the most fundamental circuits in a battery pack is the protection circuit. Rechargeable battery performance, especially with respect to those having cells constructed of lithium-based materials, may be severely compromised if the cell within the battery pack is over or under charged. For this reason, most all battery packs today include one form of safety circuit or another.

Typical safety circuits include voltage and current limits. As such, when the voltage across the cell in a battery pack becomes too high or too low, the safety circuit will open switches within the pack, thereby "turning off" the battery pack. Similarly, if the current flowing either into or out of the cell gets too high, the safety circuit will turn off the battery pack.

Despite these voltage and current safety mechanisms, new concerns are arising from "over power" situations. These situations arise when a battery pack is operating within its voltage and current limits, but the total power—the product of voltage and current—becomes too high for a particular electronic device. The concern is that the over power situation may cause components within the electronic device to generate excessive heat.

There is thus a need for an improved battery safety circuit that turns off the battery not only due to excessive voltage or current, but for excessive power dissipation as well.

DETAILED DESCRIPTION OF THE INVENTION

Figure 1:
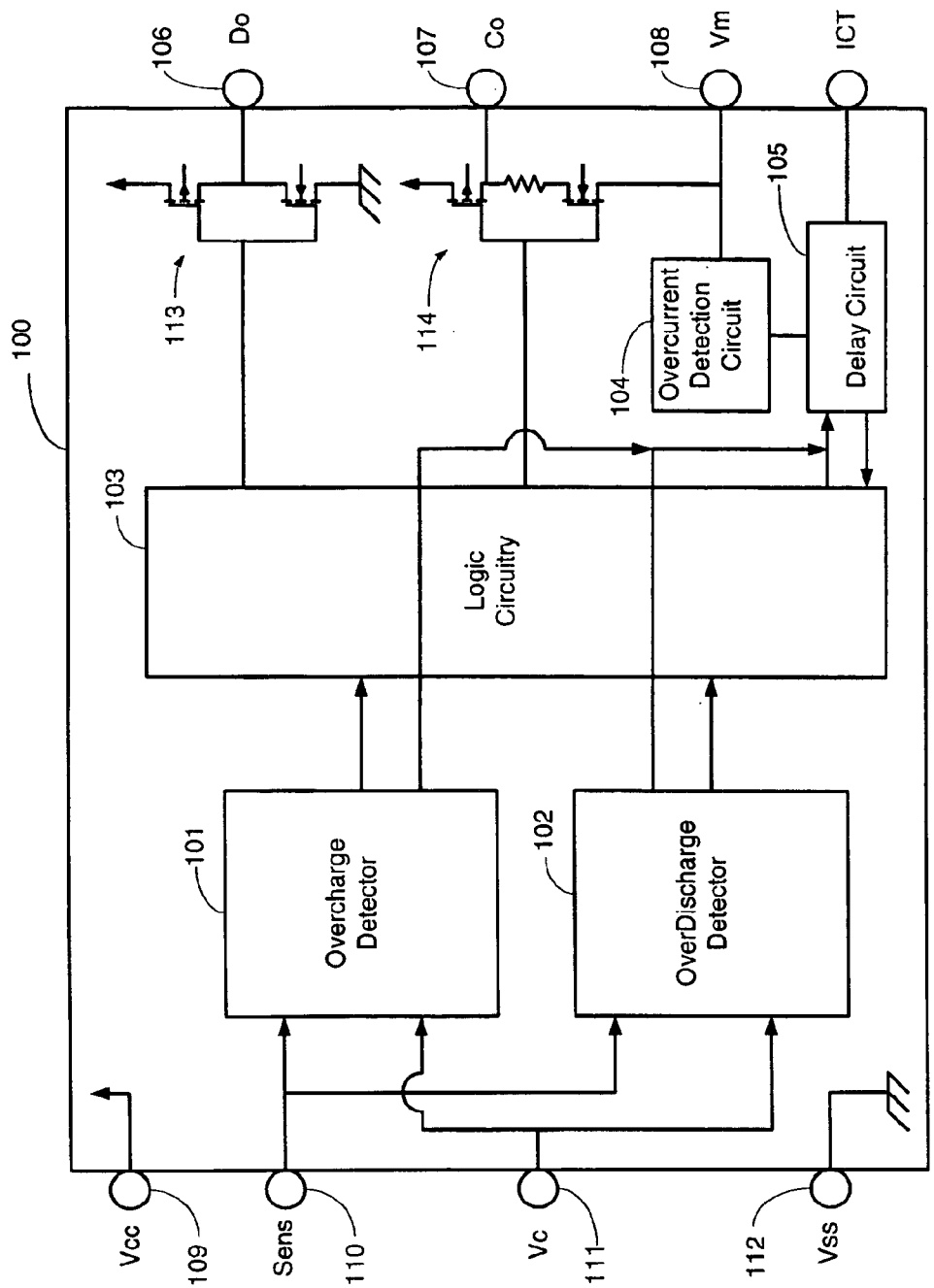
FIG. 1 illustrates a block diagram of a safety circuit IC.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention provides a overpower protection circuit that may be used in conjunction with an existing battery safety circuit to offer an additional level of protection. The overpower circuit monitors the power being delivered to or from the cells in a battery pack. When the power exceeds a predetermined threshold, the overpower circuit simulates an overcurrent condition with respect to the safety circuit. This overcurrent simulation causes the protection circuit to open one or more serial pass elements, thereby isolating the cells from the external terminals of the battery pack. The overpower circuit then resets itself when the load is removed from the battery pack. The combination of the overpower circuit with the conventional battery safety circuit provides a system that protects not only from excessive voltages and currents, but from excessive power dissipation levels as well.

Prior to understanding the overpower circuit, a brief overview of battery safety circuits is warranted. As used herein, a "safety circuit" is any circuit capable of monitoring the voltage across at least one rechargeable cell, in addition to being capable of monitoring the current flowing through the cell or cells. One example of such a circuit is the S8232 series of safety circuits manufactured by Seiko Instruments, Inc. For discussion and exemplary purposes, such a circuit will be discussed herein. It will be clear to those of ordinary skill in the art who have the benefit of this disclosure, however, that the invention is not so limited. Discrete circuits, application specific circuits and safety circuits manufactured by other companies, including Ricoh and Mitsumi for example, may be equally substituted for the Seiko circuit.

By way of background, referring now to FIG. 1, illustrated therein is a block diagram of an S-8232 safety circuit 100. The S-8232 safety circuit is designed to be used with two, serial, lithium-based cells. Again, it will be clear to those of ordinary skill in the art with the benefit of this disclosure that the invention is not so limited. The overpower circuit discussed herein may be equally applied to any combination of serial or parallel cells.

The safety circuit 100 may be as simple as a single integrated circuit (IC) that provides a means for monitoring of cell voltage and current, and thereby controls the charging and discharging of the cells within a battery pack. Discrete equivalents of the IC may also be substituted. The safety circuit 100 includes an overcharge detector 101 that monitors the voltages across the corresponding cells. The overcharge detector 101 compares these voltages to a predetermined maximum cell voltage. When the cell voltage exceeds this threshold, the overcharge detector 101, via some internal logic circuitry 103, causes a push-pull output stage 114 to actuate the charge pin 107. When the charge pin 107 is coupled to a disconnect means, like a transistor acting as a switch in its non-linear region, actuation will prevent any further charging of the cells.

Similarly, the safety circuit includes an overdischarge detector 102 that ensures that the voltage across the cells does not fall below a predetermined threshold. If it does, the overdischarge detector 102 causes an output stage 113 to actuate the discharge pin 106. When the discharge pin 106 is coupled to a disconnect means, like a serial transistor, actuation prevents any further discharge.

Cell current is monitored by way of an overcurrent detection pin 108 coupled to an overcurrent detection circuit 104. The overcurrent detection pin 108 senses the voltage between the Vss pin 112 and the overcurrent detection pin 108. When this voltage exceeds a predetermined threshold, as will be explained in more detail later, the overcurrent circuit 104 causes the discharging pin 106 to actuate, thereby stopping the flow of current in the discharge direction. In some situations, with some safety circuits, the charging pin 107 may also actuate.

When the load is removed, as evidenced by an impedance greater than 200 MΩ appearing between the Sens pin 10 and the overcurrent pin 108, the safety circuit 100 resets, thereby deactuating the discharge pin 106. This action will be more evident with the discussion of FIG. 2 below.

Other components of the safety circuit 100 include a Vcc pin 109, a center tap pin 111, and a Vss pin 112, that monitor the voltage at the cathode, between, and at the anode of serial cells, respectively. Additionally, a delay circuit 105 provides some hysteresis and transient immunity.

Figure 2:
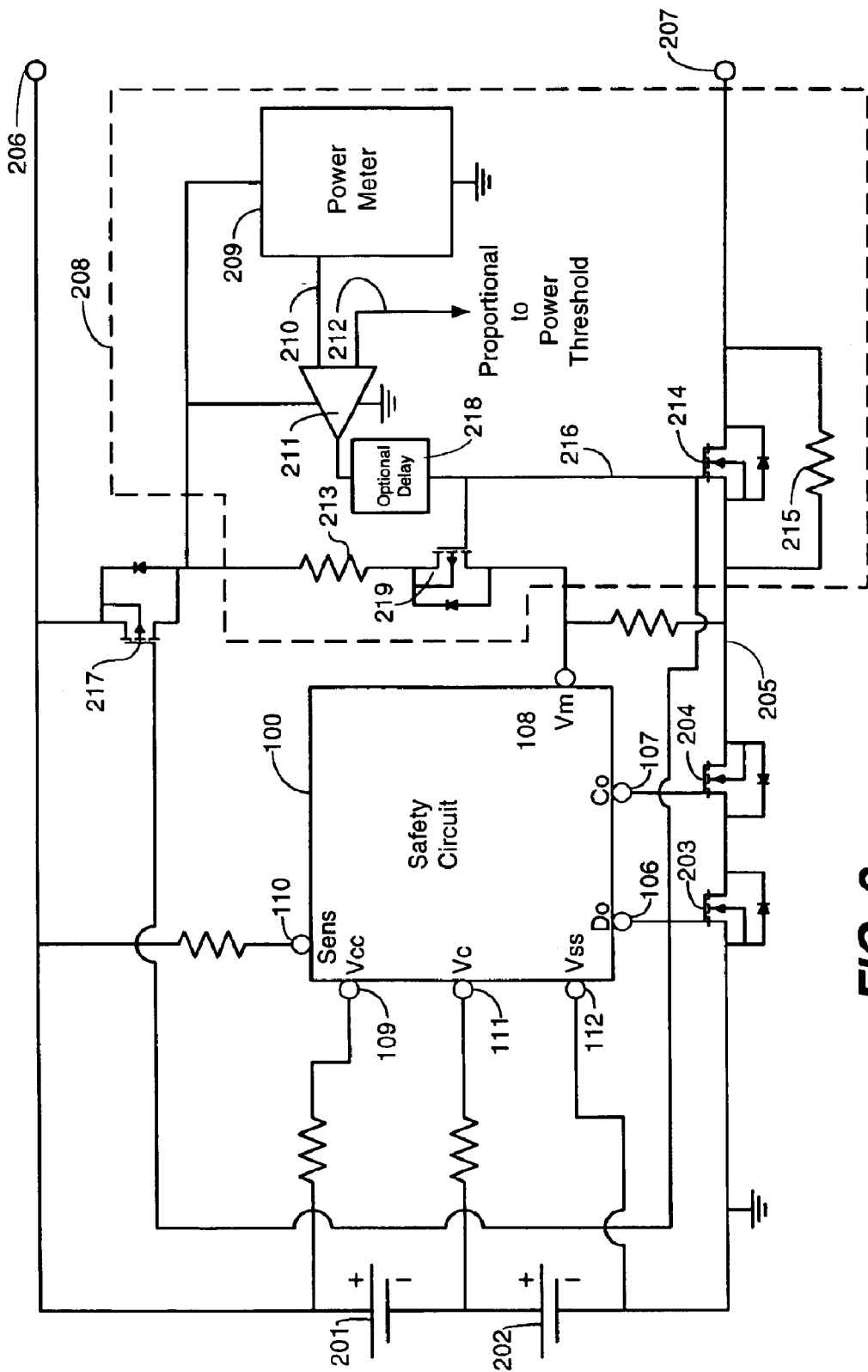
FIG. 2 illustrates a protection circuit having a safety circuit and overpower circuit in accordance with the invention.

Referring now to FIG. 2, illustrated therein is one preferred embodiment of a battery protection circuit in accordance with the invention. The safety circuit 100 from FIG. 1 is coupled to a pair of rechargeable cells 201,202. The charge pin 107 and the discharge pin 106 are coupled to disconnect means 203,204, respectively, which are in turn coupled serially with the cells 201,202. The disconnect means 203,204 in this exemplary embodiment are field effect transistors (FETs), although other devices, including switches, relays, circuit breakers and controllable fuses may be substituted, depending upon the application.

The overcurrent pin 108 is coupled to the low side 205 of the circuit, such that the overcurrent pin 108 may work in conjunction with the Vss pin 112 to sense the voltage across the FETs 203,204. When this voltage becomes too high, the safety circuit 100 knows that the current being drawn from the cells 201,202 is correspondingly too high. When this occurs, the discharge pin 106 causes the FETs 203 to open, thereby preventing current from flowing to the external terminals 206,207. The safety circuit 100 resets, and thus closes the FET 203, when an impedance greater than 200 MΩ is sensed between the Sens pin 10 and the overcurrent pin 108. This occurs when a load (not shown) is removed from the terminals 206,207, thereby creating an open circuit between the terminals 206,207.

Figure 3:
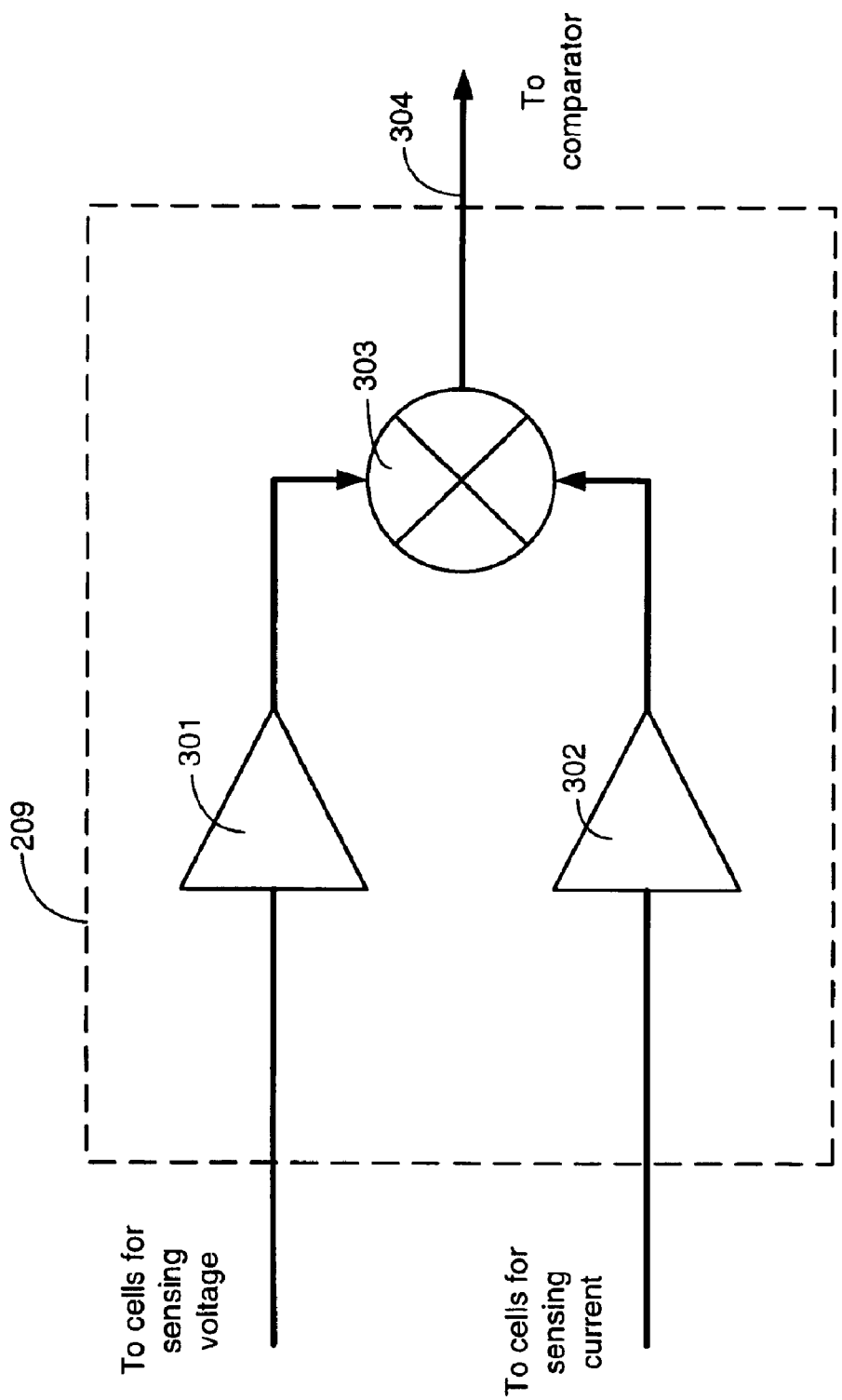
FIG. 3 illustrates one embodiment of a power meter in accordance with the invention.

The overpower circuit 208 includes a power meter 209 that acts as a means of monitoring power being delivered to or from the cells 201,202. The power meter 209, explained in more detail with the discussion of FIG. 3, is any circuit that is capable of determining whether the product of the voltage across the at least one rechargeable cell and the current flowing through the at least one rechargeable cell exceeds the predetermined threshold. It may include a circuit that generates a signal that is proportional to the product of the voltage across the cells and the current flowing through the cells. It may also be a circuit that simply generates a binary, up or down signal that indicates whether the power is above or below the threshold. The power meter 209 may be an accurate, linear power meter, or may be a simpler circuit that approximates power, for example by way of piecewise linear or other approximation means.

The power signal 210 is then coupled to a comparator 211 that has a signal 212 (like a reference voltage) that is proportional to the predetermined threshold of power. When the power signal 210 exceeds the predetermined threshold 212, the comparator 211 actuates. The predetermined threshold may be set to any level required by the application. One exemplary threshold for a two-serial-cell configuration, that is intended to comply with a corresponding temperature threshold limit set forth by the Atmospheric Explosive (ATEX) directive set forth by the European Union, is nine watts. In any event, when the signal proportional to power is below the predetermined threshold, the output 216 of the comparator 211 is in a first state. The output 216 of the comparator 211 switches to a second state when the signal proportional to power exceeds the predetermined threshold.

When the power sourced from the cells 201,202 exceeds the predetermined threshold, the overpower circuit 208 simulates an overcurrent condition within the safety circuit 100, causing the FET 203 to open or enter a high impedance state, thereby preventing current from flowing from the cells 201,202. The overcurrent condition is simulated by sourcing current into the overcurrent pin 108 (as a result of increased voltage at the overcurrent pin 108), and thus into the overcurrent detection circuit within the safety circuit 100.

Such an overpower condition would arise as follows: The power meter 209 would be continually monitoring the power sourced from the cells 201,202. The load connected to the terminals 206,206 would begin drawing power in excess of the predetermined threshold. The power meter 209 determines that this is the case, causing the power signal 210 to rise above the power threshold signal 212. This, in turn, actuates the comparator 211.

A switch 219, shown here as a FET, is responsive to the comparator and closes upon actuation of the comparator 211. This pulls the overcurrent pin 108 to the cell voltages, thereby causing current to flow into the overcurrent pin 108 through a current limiting resistor 213. To the safety circuit 100, this appears to be an overcurrent situation. The safety circuit 100 then opens the discharge FET 203, thereby preventing any current from flowing out of the cells 201, 202. As such, the cells 201,202 are disconnected from the terminals 206,207 as a result of power dissipation exceeding the predetermined threshold. An optional delay circuit 218, for example a R-C filter, may be coupled between the comparator 211 and the switch 219 where a delay prior to opening the FET 203 is desired. Such a delay may be desirable when a host device needs time to complete an operation prior to power down.

In parallel, an optional second disconnect means 214, shown here as a FET, may be coupled to the comparator 211 so as to be responsive to the comparator 211. The second disconnect means 214, coupled serially between the terminals 206,207 and the cells 201,202, operates as a secondary circuit breaker and opens when the comparator 211 is actuated. As such, if the discharge FET 203 fails, the second disconnect means will still disconnect the cells 201,202 from the terminals 206,207 when an overpower condition occurs.

Figure 5:
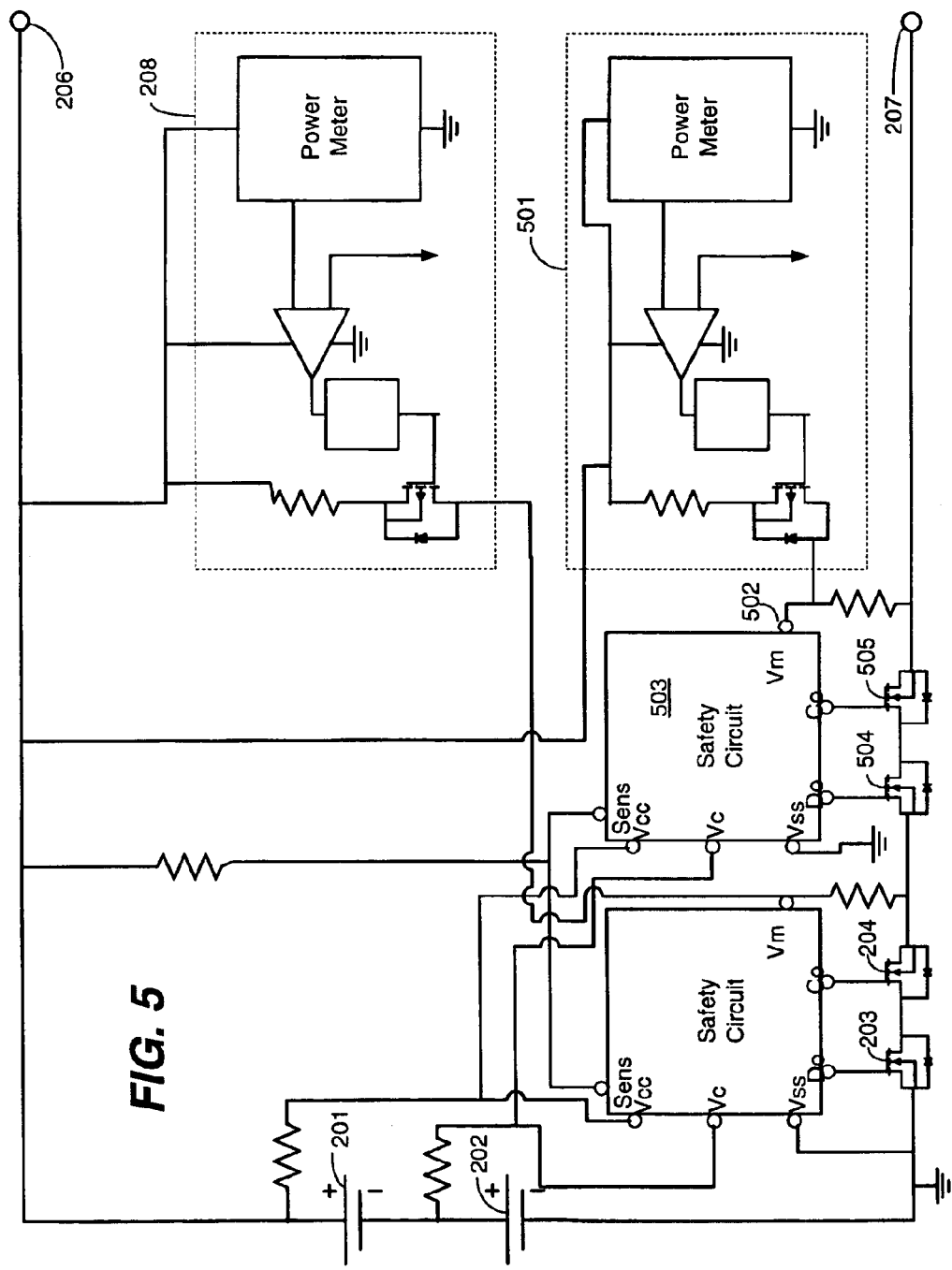
FIG. 5 illustrates a protection circuit having a plurality of safety circuits and overpower circuits in accordance with the invention.

Note that this second disconnect means 214 is optional, as it is advantageous in some designs. For example, in circuits where redundancy is needed for reliability, a designer may decide to employ two separate safety circuits, using the second safety circuit to control a second discharge FET, which would thus serve as the optional second disconnect means. In such a case, one example of which is illustrated in FIG. 5, either the overpower circuit 208, or a redundant overpower circuit 501, would be connected to the overcurrent pin 502 of a second safety circuit 503, with the charge and discharge FETs 504,505 of the second safety circuit 503 being coupled serially with the terminals 206,207, the cells 201,202, and the first charge and discharge FETs 203,204. Other designs may need neither the second safety circuit nor the second disconnect means.

A leakage current path in parallel with the second disconnect means 214 is provided by a resistor 215. The resistor 215 provides a latching mechanism that causes the safety circuit 100 to remain in the simulated overcurrent condition. Recall that the safety circuit 100 resets when the impedance between the sense pin 110 and the overcurrent pin 108 exceeds 200 MΩ. This would be the case when the second disconnect means 214 opens. As such, a leakage path provided by the resistor 215 ensures that the safety circuit 100 stays latched in the simulated overcurrrent condition until the load is removed from the terminals 206,207. Resistance values for resistor 215 range from 100 kΩ to 500 kΩ, preferably about 200 kΩ. Note that when a second safety circuit is used to control the second disconnect means 214, the leakage current path may not be necessary, as the second safety circuit provides an internal leakage path.

As stated, when the overpower, and thus the simulated overcurrent, condition is initiated, the cells 201,202 are disconnected from the terminals 206,207 by way of the FET 203. In such a state, it is not desirable to have electrical components within the battery pack discharge the cells 201,202. As such, the invention provides a means of disabling the overpower circuit 208. Disablement is accomplished by a switch coupled between the high side terminal 206 of the circuit and the overpower circuit 208. This switch 217, shown for exemplary purposes as a FET, is coupled to the discharge pin 106 of the safety circuit 100.

When the discharge pin 106 is actuated, the switch 217 turns off, thereby blocking current from flowing to the overpower circuit. Thus, in an overpower condition, the overpower circuit 208 first simulates an overcurrent condition in the safety circuit 100, thereby causing the discharge pin 106 to actuate. This, in turn, causes the switch 217 to open, thereby deactivating the overpower circuit 208.

Such a scenario is perfectly acceptable, in that the overpower circuit 208 is no longer needed to monitor power being delivered from the cells 201,202, as there is no power being delivered from the cells 201,202 since the charge and discharge FET 203 is open. Upon removal of the load, however, the safety circuit 100 resets, thereby causing closure of the FET 203, thereby closing the switch 217, thereby reactivating the overpower circuit 208. The safety circuit will then revert back to normal operation.

Referring now to FIG. 3 illustrated therein is one example of a power meter 209 in accordance with the invention. The power meter 209 includes a means for measuring or sensing the voltage across the cells, as well as a means for measuring or sensing the current flowing through the cells. Both the means of measuring voltage and current may comprise analog amplifiers 301,302 coupled to the cells. In the case of voltage, the amplifier 301 may have inputs coupled across the cells to measure the voltage. The gain of the amplifier 301 would be scaled such that the product output is at a level that is acceptable by the comparator.

In the case of current, the amplifier 302 input may be coupled to a means of sensing current, like a current sense resistor for example. As with the voltage amplifier 301, the gain of the current amplifier 302 would be scaled such that the product output is at a level that is acceptable by the comparator.

Figure 4:
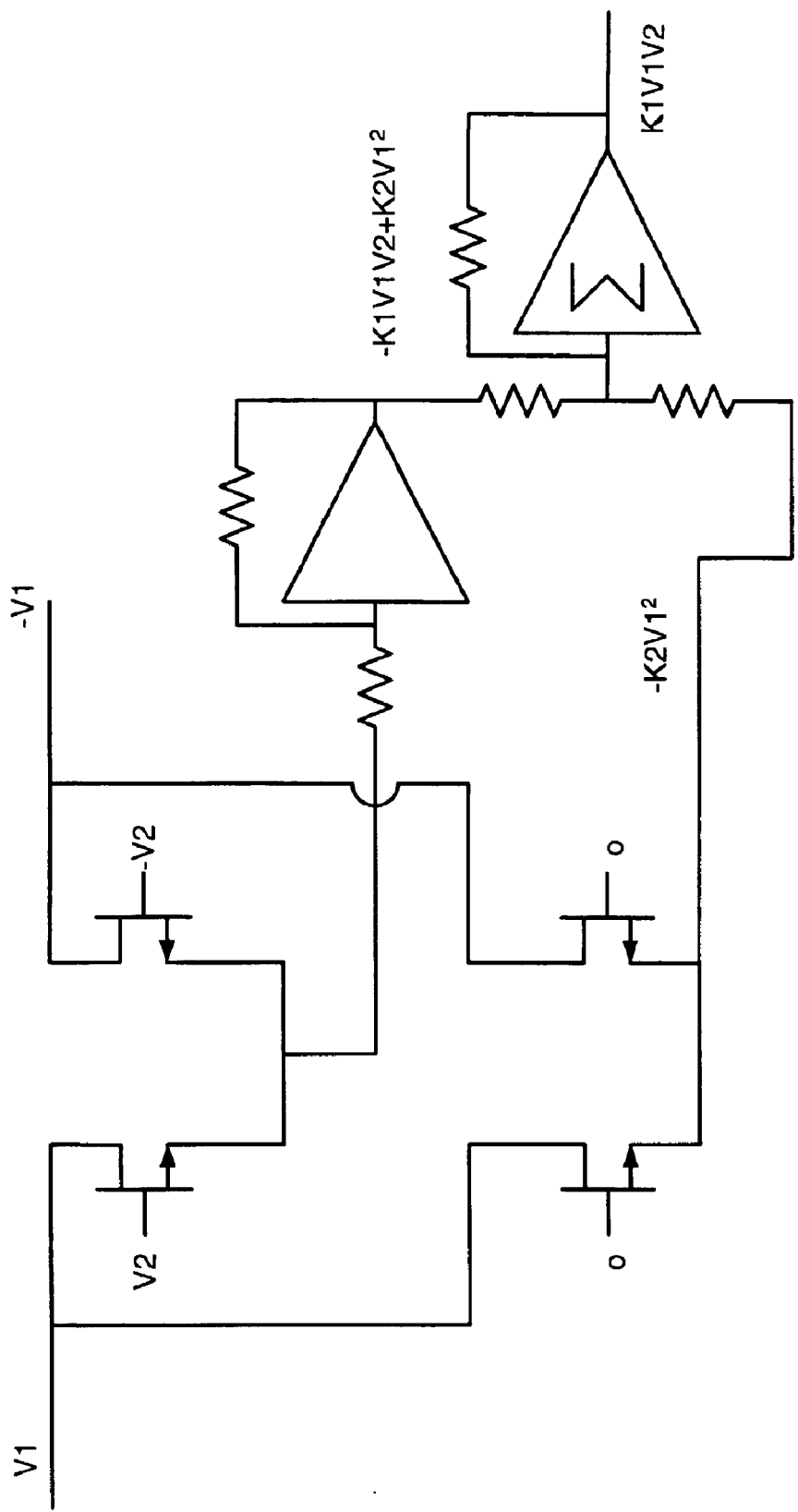
FIG. 4 illustrates one embodiment of an analog multiplier in accordance with the invention.

The outputs of the amplifiers 301,302 are then fed into an analog multiplier 303. The analog multiplier produces a product output 304 that is proportional to the product of voltage and current. This output 304 is then fed to the comparator 211. One example of an analog multiplier is shown in FIG. 4, and is also taught in U.S. Pat. No. 3,562,553, entitled "Multiplier Circuit, issued to Roth, which is incorporated herein by reference for all purposes.

Note that the power meter of FIG. 2 and the multiplier circuit of FIG. 3 are but one exemplary embodiment of a power meter in accordance with the invention. It will be clear to those of ordinary skill in the art who have the benefit of this disclosure that the invention is not so limited. Numerous other power measurement circuits, including those employing logarithmic amplifiers, microprocessors with analog to digital converters, hall effect multipliers, and other analog and digital circuits may be equally substituted. The only requirement is that the power measurement circuit be capable of producing a signal proportional to the amount of power being sourced from, or delivered to, the cells.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one preferred embodiment of the invention is a rechargeable pack comprising the battery protection circuit taught in FIG. 2, the invention is not so limited. It may be applied to any power source, including power supplies, fuel cells, solar cells and the like. Additionally, it may be incorporated into the host device as well as within the battery pack.

What is claimed is:

1. A battery protection circuit, comprising:
   a. at least one rechargeable cell;
   b. a safety circuit coupled to the at least one rechargeable cell, the safety circuit comprising a means for monitoring a voltage across the at least one rechargeable cell, further comprising a means for monitoring a current flowing through the at least one rechargeable cell;
   c. at least one disconnect means coupled serially with the at least one rechargeable cell;
   d. a means of monitoring power being delivered either to or from the al least one rechargeable cell; and
   e. a means for simulating an overcurrent condition within the safety circuit when the means for monitoring power determines that the power being delivered either to or from the at least one rechargeable cell exceeds a predetermined threshold.

2. The circuit of claim 1, wherein the means of monitoring power monitors the power being delivered from the at least one rechargeable cell.

3. The circuit of claim 2, further comprising at least a second disconnect means, the at least a second disconnect means being responsive to the means for monitoring power being delivered from the at least one rechargeable cell.

4. The circuit of claim 3, further comprising a leakage current path in parallel with the at least a second disconnect means, the leakage current path having a resistance in excess of one hundred thousand Ohms.

5. The circuit of claim 1, further comprising at least an additional disconnect means coupled between the at least one rechargeable cell and the means of monitoring power delivered to or from the at least one rechargeable cell, wherein when the overcurrent condition is simulated, the safety circuit actuates the at least an additional disconnect means to deactivate the means for monitoring power delivered to or from the at least one rechargeable cell.

6. The circuit of claim 1, wherein the at least one disconnect mews are selected from the group consisting of transistors, switches, relays, circuit breakers, and fuses and positive temperature coefficient devices.

7. The circuit of claim 1, wherein the means for monitoring power being delivered comprises:
   a. a means for measuring the voltage across the at least on rechargeable cell;
   b. a means for measuring the current flowing through the at least on rechargeable cell;
   c. a means of determining whether the product of the voltage across the at least one rechargeable cell and the current flowing through the at least one rechargeable cell exceeds the predetermined threshold; and
   d. a comparator, wherein an output of the comparator is in a first state when a product of the voltage across the at least one rechargeable cell and the current flowing through the at least one rechargeable cell is below the predetermined threshold; further wherein the output of the comparator is in a second state when a product of the voltage across the at least one rechargeable cell and the current flowing through the at least one rechargeable cell is above the predetermined threshold.

8. The circuit of claim 1, wherein the predetermined threshold is nine watts.

9. The circuit of claim 1, wherein the safety circuit comprises:
   a. an overcharge detector;
   b. an undercharge detector; and
   c. an overcurrent detection circuit.

10. The circuit of claim 9, wherein the overcurrent situation is simulated by sourcing current into the overcurrent detection circuit.

11. A rechargeable battery pack comprising the circuit of claim 1.

12. A battery protection circuit having a power monitoring circuit, wherein the power monitoring circuit determines when power exceeds a predetermined threshold, comprising:
    a. at least one rechargeable cell;
    b. at least one safety circuit coupled to the at least one rechargeable cell;
    c. at least one disconnect means coupled serially with the at least one rechargeable cell; and
    d. at least one means for simulating an overcurrent condition within the safety circuit when the power monitoring circuit determines that power exceeds the predetermined threshold.

13. The circuit of claim 12, wherein when the at least one means for simulating an overcurrent condition within the safety circuit simulates an overcurrent condition, the at least one disconnect means enters a high impedance state.

14. The circuit of claim 13, wherein the at least one disconnect means are selected from the group consisting of transistors, switches, relays, circuit breakers and fuses and positive temperature coefficient devices.

15. The circuit of claim 14, wherein power monitoring circuit comprises:
    a means for sensing the voltage across the at least on rechargeable cell;
    b. a means for sensing the current flowing through the at least on rechargeable cell;
    c. a means of determining whether the product of the voltage across the at least one rechargeable cell and the current flowing through the at least one rechargeable cell exceeds the predetermined threshold; and
    d. a comparator, wherein an output of the comparator is in a first state when a product of the voltage across the at least one rechargeable cell and the current flowing through the at least one rechargeable cell is below the predetermined threshold; further wherein the output of the comparator is in a second state when a product of the voltage across the at least one rechargeable cell and the current flowing through the at least one rechargeable cell is above the predetermined threshold.

16. The circuit of claim 15, wherein the predetermined threshold is nine watts.

17. The circuit of claim 16, wherein the safety circuit comprises:
    a. an overcharge detector,
    b. an undercharge detector, and
    c. an overcurrent detection circuit.

18. The circuit of claim 17, wherein the overcurrent situation is simulated by sourcing current into the overcurrent detection circuit.

* * * * *